Nov. 7, 1944.  H. SWANSON  2,362,171
FLOODLIGHT FULL-BEAM ELECTRIC LAMP
Filed May 25, 1943   2 Sheets-Sheet 2
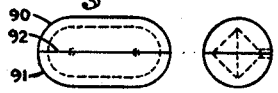
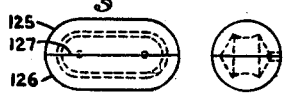
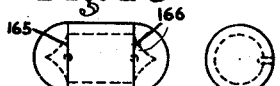
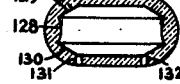
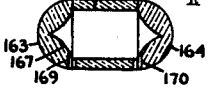
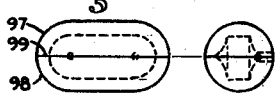
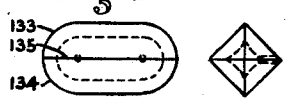
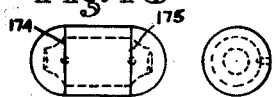
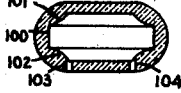
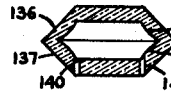
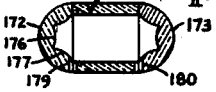
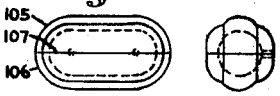
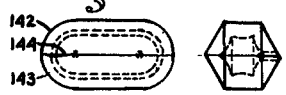
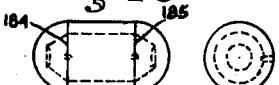
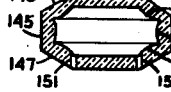
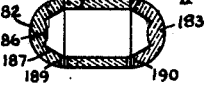
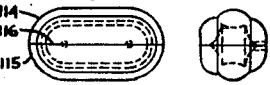
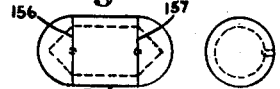
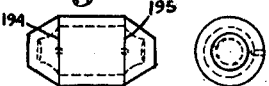
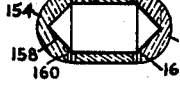
Witnesses:  Inventor
Florence Hilston  Harold Swanson
Gustave W. Hilston Patented Nov. 7, 1944

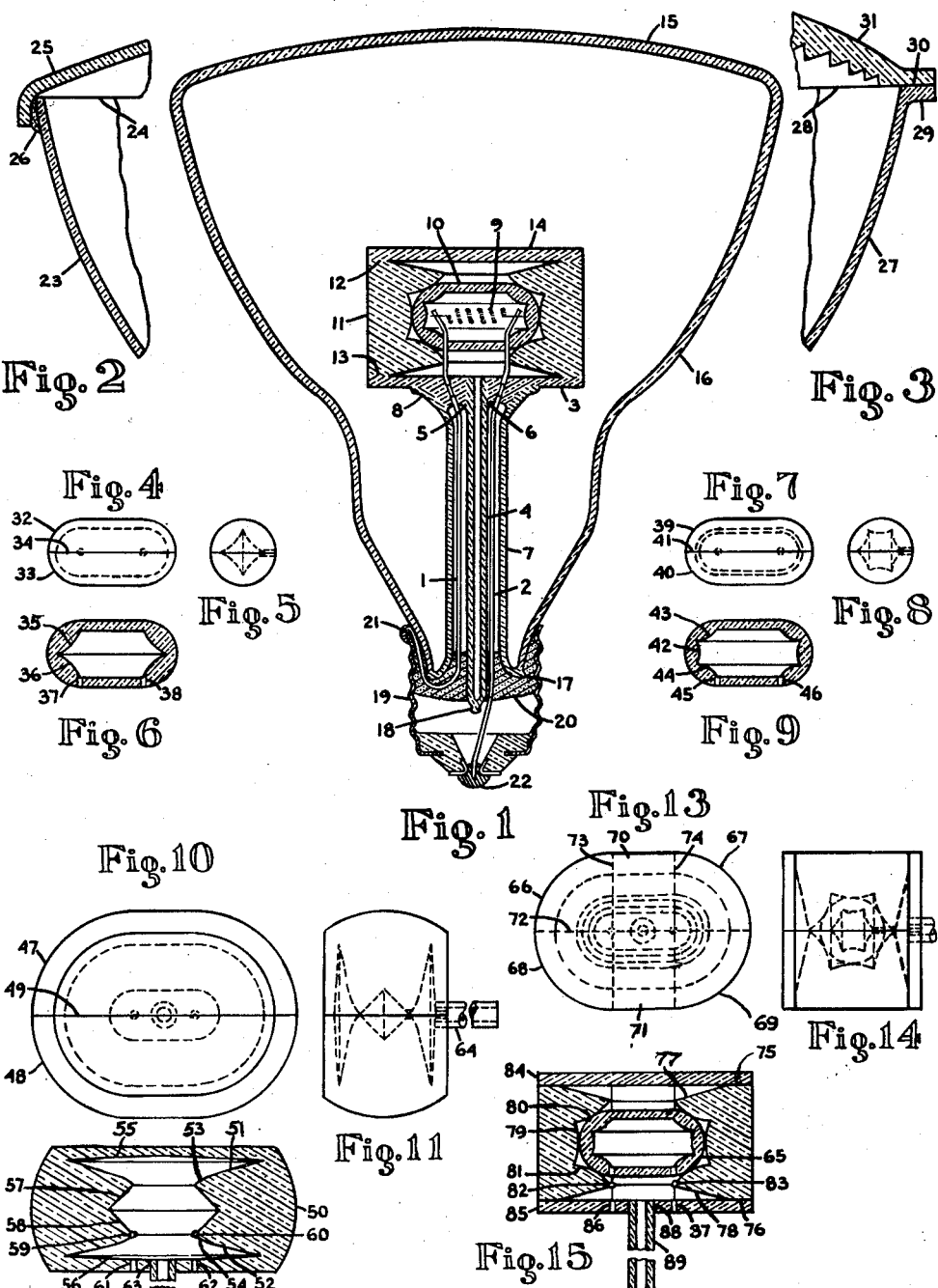

2,362,171

UNITED STATES PATENT OFFICE 2,362,171

FLOODLIGHT FULL-BEAM ELECTRIC LAMP

Harold Swanson, Brownhelm Township, Lorain County, Ohio

Application March 25, 1943, Serial No. 480,420

4 Claims. (Cl. 176—34)

This invention relates to improvements to increase the effective illumination produced by focusing type of electric lamps and similar articles, but more particularly those electric lamps which are known as floodlight lamps.

One object of this invention is to show a practical means of constructing a floodlight electric lamp with optical elements that completely surround the lamp's light source and gathering the light produced into a more concentrated beam. These optical elements are described herein as full-beam refracting elements, and it is through them that the floodlight full-beam electric lamp was invented. Therefore any electric lamp constructed with said full-beam refracting elements therein, is a full-beam electric lamp.

A further object is that this application, together with my copending applications Serial Numbers 480,421, 480,422, 480,423, 480,424 and 480,425, filed March 25, 1943, is a continuation in part of my full-beam electric lamp application Serial Number 402,778, filed July 17, 1941, in which nearly an exact duplicated description of these inventions were originally presented. The feature which is generic to all these inventions is the full-beam refracting element and its adaptation in construction, and operation to gather the light in nearly all directions from a light source into a concentrated beam, as applied to electric lamps; however on account of the present Patent Office regulations restricting the limitations presented in a single application, it was necessary to segregate these applications.

A further object is to show that certain improvements set forth in my original application Serial Number 744,598, filed September 18, 1934, and subsequently continued through the following: Patent Number 2,097,679, patented November 2, 1937; Patent Number 2,137,732, patented November 22, 1938; Patent Number 2,154,542, patented April 18, 1939; Patent Number 2,222,093, patented November 19, 1940, are adaptable to make floodlight full-beam electric lamps and similar articles.

A further object is that this invention is a continuation of earlier inventions mentioned in the preceding paragraph, in respect to where any improvements or subject matter of my earlier inventions can be used to advantage with the improvements of this invention, particularly the use of hollow metal wires and their many features which are described in the previous applications or patents and in this application.

A further object is that many features or improvements used in connection with my copending applications, previously referred to, can be used to advantage with this application, particularly the full-beam refracting elements and the many cross combinations possible by their substitution herein.

Other objects of this invention will appear more fully described and illustrated hereinafter.

Fig. 1 is a sectional view of a floodlight full-beam electric lamp. Fig. 2 and Fig. 3 being sectional segment views of the lamp bulb variations for Fig. 1.

Fig. 4 to Fig. 9 are elevational and sectional views of inner full-beam refracting elements for floodlight full-beam electric lamps.

Fig. 10 to Fig. 15 are elevational and sectional views of the assembled full-beam refracting elements for floodlight full-beam electric lamps.

Fig. 16 to Fig. 51 are elevational and sectional views of inner full-beam refracting elements for floodlight full-beam electric lamps.

Referring to Fig. 1 which is a sectional view of a floodlight full-beam electric lamp; having two regular three-piece electric lamp lead-in wires 1 and 2 inserted through holes in the lower glass plate 3 (see Fig. 13 to Fig. 15 for details) and hermetically sealed and embedded therein, along with the glass exhaust tube 4, by glass fusion at 5 and 6; then the upper flange of the glass stem flared tube 7 is sealed by glass fusion with the plate 3 at 8; a coiled coil electric lamp filament 9 is positioned and spot-welded or clamped to the inner ends of the lead-in wires 1 and 2; enclosing the filament 9 are two halves of the inner full-beam refracting element 10 (see Fig. 7 to Fig. 9 for details) surrounded by two halves of the outer full-beam refracting element 11 (see Fig. 13 to Fig. 15 for details) all being made from heat resisting glass (only the rear halves of elements 10 and 11 are shown here); both halves of the refracting element 11 being previously coated on the center junction surfaces and also around the edge facing at 12 and 13 with a thin film of suitable glass fusing material, and all hermetically sealed together with the upper glass plate 14 and the lower glass plate 3 by glass fusion, to form the full-beam lamp stem assembly; a large glass bulb 15 having a parabolic curved surface 16 is then hermetically sealed by glass fusion to the stem assembly flare at 17; then the lamp is exhausted to a vacuum, or exhausted and filled with an inert gas, at low pressures, through the contracted glass exhaust tube 4 which is heated and tipped off at 18; the remaining space within the large lamp bulb 15 being air at atmospheric pressure; then the outside face of the parabolic surface at 16 is coated with silver, or any other suitable metal, to give a mirrored surface which is lacquered or painted for protection; a standard electric lamp screw base 19 is coated on the inside with a suitable basing cement at 20 and cemented to the bulb neck of the lamp as shown, with the lead-in wires 1 and 2 soldered to the base 19 at 21 and 22.

Referring to Fig. 2 which is a segment sectional view of a substitute bulb construction for the bulb 15 in Fig. 1; having a large glass bulb 23 that is made open on its large end at 24, over which the glass cover 25 is cemented or hermetically sealed by glass fusion all around the edge at 26 with a suitable cement or glass fusing material.

Referring to Fig. 3 which is a segment sectional view of a substitute bulb construction for the bulb 15 in Fig. 1; having a large glass bulb 27 that is made open on its large end at 28 with an encircling flange 29 which is coated with a film of suitable cement, or glass fusing material, all around the edge at 30 and cemented, or hermetically sealed by glass fusion, with the prismatic lens 31.

When the large lamp bulb in Fig. 1 is made with the substitute bulb construction in Fig. 2 or Fig. 3, the full-beam electric lamp stem assembly can be inserted through the large end of the bulbs 23 or 27 and sealed at 17 with a bulb neck that is only slightly larger than the lamp base 19.

In Fig. 1, the parabolic curved surface 16 can be mirror coated on the inside of the bulb and lacquered for protection if desired. Also openings can be made by grooves on the center junction surfaces of element 10 around the lead-in wires 1 and 2, and in element 11 at 13, to permit the entire inside volume of the bulb 15 and the elements 10 and 11, to be exhausted to a vacuum, or exhausted and filled with an inert gas, at low pressures.

In Fig. 1, another improvement which is a further object of this invention which relates to my previous inventions, is that, any of the small electric lamps or their variations which are described in the previously mentioned patents (2,097,679, 2,137,732, 2,154,542, and 2,222,093) can be substituted for the filament 9, together with any other improvements mentioned therein, such as a string of pin-head electric lamps, or a metallic vapor capillary tube therein; then hydrogen gas can be sealed within the elements and large bulb surrounding the small lamps or capillary tube to dissipate the heat much faster.

In Fig. 1, the inner refracting element 10 can be hermetically sealed with the light source or filament 9 therein, by using hollow metal wires for the lead-in wires to exhaust, or exhaust and gas fill, and finally seal air tight element 10 as an individual lamp or unit, which can be connected to the lead-in wires 1 and 2, and assembled within the outer element 11, and the large lamp, as previously described.

In Fig. 4 to Fig. 51, the details are generally symmetrical about their center lines, and for convenience, so as not to crowd the numbers, I have shown the numbers designating details of either half indiscriminately, and in only one view.

In Fig. 4 to Fig. 51, each part is shown by three views in third-angle orthographic projection, a plan or top elevation, a side elevation, and the lower one being a center sectional view.

Referring to Fig. 4 to Fig. 6 collectively which shows the inner refracting elements for a floodlight full-beam electric lamp; having two inner half full-beam elongated refracting elements 32 and 33 each being a semi-cylinder with quadrant-spherical ends made from heat resisting glass and fitting together on their center line junction surfaces at 34; each element 32 or 33 having a light source chamber which is formed by elongated semi-cone surfaces at 35 and 36 whose flanks are shaped to a convex lens cross-section; lead-in wire grooves are formed at 37 and 38. Elements 32 and 33 are constructed around the polar axis.

Referring to Fig. 7 to Fig. 9 collectively which shows the inner refracting elements for a floodlight full-beam electric lamp; having two inner half full-beam elongated refracting elements 39 and 40 each being a semi-cylinder with quadrant-spherical ends made from heat resisting glass and fitting together on their center line junction surfaces at 41; each element 39 or 40 having a light source chamber which is formed by an elongated semi-circular ring surface at 42 shaped to a convex lens cross-section, with two elongated semi-cone surfaces at 43 and 44 whose flanks are shaped to a convex lens cross-section; lead-in wire grooves are formed at 45 and 46. Elements 39 and 40 are constructed around the polar axis.

Referring to Fig. 10 to Fig. 12 collectively which shows the refracting elements for a floodlight full-beam electric lamp; having two half full-beam elongated refracting elements 47 and 48 each being an elongated semi-circular body made from heat resisting glass and fitting together on their center line junction surfaces at 49; each element 47 or 48 having a crown around its outer surface at 50 to form the shape of a convex lens cross-section; each element 47 or 48 having upper and lower flat parallel faces; each element 47 and 48 having two recessed chambers formed by elongated cone surfaces at 51 and 52 with curves at 53 and 54 which approximates parabolic light reflecting surfaces at 53 and 54 and then curving into 135° (approximate) prism light reflecting surfaces at 51 and 52 for light-rays radiating from the center line of the light source chamber, and also formed by elongated shallow cone surfaces at 55 and 56; each element 47 or 48 having a light source chamber which is formed by elongated double cone surfaces at 57 and 58; lead-in wire grooves are formed at 59, 60, 61, and 62; each element 47 or 48 having a semi-cylindrical groove at 63 for the glass exhaust tube 64. Elements 47 and 48 are constructed around the polar axis.

Referring to Fig. 13 to Fig. 15 collectively which shows the refracting elements and connecting plates for a floodlight full-beam electric lamp; having the inner full-beam refracting element 65 (see Fig. 7 to Fig. 9 for details) and four quarter full-beam refracting elements 66, 67, 68, and 69, with two spacer refracting elements 70 and 71, all being made from heat resisting glass and fitting together on their center line junction surfaces at 72, 73, and 74; each element 66, 67, 68, and 69 having a quadrant cylindrical body with upper and lower parallel flat rims at 75 and 76, and tapering inward to quadrant cones whose flanks form 120° (approximate) prism light reflecting surfaces at 77 and 78 for light-rays radiating from the center line of the light source chamber within element 65; each element 66, 67, 68, and 69 having a chamber which is formed by a quadrant ring surface at 79 shaped to a convex lens cross-section, with two quadrant cone surfaces at 80 and 81 whose flanks are shaped to a convex lens cross-section enclosing element 65; each element 70 and 71 having exactly the same cross-sectional shape as elements 66, 67, 68, and 69, except being made straight with parallel ends instead of quadrant shaped; lead-in wire grooves are formed at 82 and 83; two glass oval connecting plates 84 and 85 fitting the elements 66, 67, 68, 69, 70, and 71 on their respective rims at 75 and 76; the lower plate 85 having lead-in wire holes at 86 and 87, with a hole at 88 for the glass exhaust tube 89. Elements 66, 67, 68, and 69 are constructed around the polar axis.

Referring to Fig. 16 to Fig. 18 collectively which shows the inner refracting elements for a floodlight full-beam electric lamp; having two inner half full-beam elongated refracting elements 90 and 91 each being a semi-cylinder with quadrant-spherical ends made from heat resisting glass and fitting together on their center line junction surfaces at 92; each element 90 or 91 having a light source chamber which is formed by elongated semi-cone surfaces at 93 and 94; lead-in wire grooves are formed at 95 and 96. Elements 90 and 91 are constructed around the polar axis.

Referring to Fig. 19 to Fig. 21 collectively which show the inner refracting elements for a floodlight full-beam electric lamp; having two inner half full-beam elongated refracting elements 97 and 98 each being a semi-cylinder with quadrant-spherical ends made from heat resisting glass and fitting together on their center line junction surfaces at 99; each element 97 or 98 having a light source chamber which is formed by an elongated semi-cylindrical surface at 100, with two elongated semi-cone surfaces at 101 and 102 whose flanks are shaped to a convex lens cross-section; lead-in wire grooves are formed at 103 and 104. Elements 97 and 98 are constructed around the polar axis.

Referring to Fig. 22 to Fig. 24 collectively which show the inner refracting elements for a floodlight full-beam electric lamp; having two inner half full-beam elongated refracting elements 105 and 106 being made from heat resisting glass and fitting together on their center line junction surfaces at 107; each element 105 or 106 having an outer elongated semi-circular ring surface at 108 shaped to a convex lens cross-section, with two outer elongated semi-cone surfaces at 109 and 110 whose flanks are shaped to a convex lens cross-section; each element 105 or 106 having a light source chamber which is formed by a semi-cylindrical surface with quadrant-spherical ends at 111; lead-in wire grooves are formed at 112 and 113. Elements 105 and 106 are constructed around the polar axis.

Referring to Fig. 25 to Fig. 27 collectively which show the inner refracting elements for a floodlight full-beam electric lamp; having two inner half full-beam elongated refracting elements 114 and 115 being made from heat resisting glass and fitting together on their center line junction surfaces at 116; each element 114 or 115 having an outer elongated semi-circular ring surface at 117 shaped to a convex lens cross-section, with two outer elongated semi-cone surfaces at 118 and 119 whose flanks are shaped to a convex lens cross-section; each element 114 or 115 having a light source chamber which is formed by an elongated semi-circular ring surface at 120 shaped to a convex lens cross-section, with two elongated semi-cone surfaces at 121 and 122 whose flanks are shaped to a convex lens cross-section; lead-in wire grooves are formed at 123 and 124. Elements 114 and 115 are constructed around the polar axis.

Referring to Fig. 28 to Fig. 30 collectively which show the inner refracting elements for a floodlight full-beam electric lamp; having two inner half full-beam elongated refracting elements 125 and 126 each being a semi-cylinder with qadrant-spherical ends made from heat resisting glass and fitting together on their center line junction surfaces at 127; each element 125 or 126 having a light source chamber which is formed by an elongated semi-circular ring surface at 128 shaped to a convex lens cross-section, with two elongated semi-cone surfaces at 129 and 130; lead-in wire grooves are formed at 131 and 132. Elements 125 and 126 are constructed around the polar axis.

Referring to Fig. 31 to Fig. 33 collectively which show the inner refracting elements for a floodlight full-beam electric lamp; having two inner half full-beam elongated refracting elements 133 and 134 each being made from heat resisting glass and fitting together on their center line junction surfaces at 135; each element 133 or 134 having outer elongated double semi-cone surfaces at 136 and 137; each element 133 or 134 having a light source chamber which is formed by elongated double semi-cone surfaces at 138 and 139 whose flanks are shaped to a convex lens cross-section; lead-in wire grooves are formed at 140 and 141. Elements 133 and 134 are constructed around the polar axis.

Referring to Fig. 34 to Fig. 36 collectively which show the inner refracting elements for a floodlight full-beam electric lamp; having two inner half full-beam elongated refracting elements 142 and 143 being made from heat resisting glass and fitting together on their center line junction surfaces at 144; each element 142 or 143 having outer elongated semi-cylindrical surfaces at 145, with two elongated semi-cone surfaces at 146 and 147; each element 142 or 143 having a light source chamber which is formed by an elongated semi-circular ring surface at 148 shaped to a convex lens cross-section, with two elongated semi-cone surfaces at 149 and 150 whose flanks are shaped to a convex lens cross-section; lead-in wire grooves are formed at 151 and 152. Elements 142 and 143 are constructed around the polar axis.

Referring to Fig. 37 to Fig. 39 collectively which shows the inner refracting elements for a floodlight full-beam electric lamp; having a tube 153 between two inner half full-beam refracting elements 154 and 155, all being made from heat resisting glass and fitting together on their junction surfaces at 156 and 157; each element 154 or 155 being an hemisphere with a light source chamber which is formed by a cone surface at 158 that matches the inside surface at 159 of tube 153; lead-in wire grooves are formed at 160 and 161. Elements 154 and 155, together with tube 153, are constructed around the equatorial axis.

Referring to Fig. 40 to Fig. 42 collectively which show the inner refracting elements for a floodlight full-beam electric lamp; having a tube 162 between two inner half full-beam refracting elements 163 and 164, all being made from heat resisting glass and fitting together on their junction surfaces at 165 and 166; each element 163 or 164 being an hemisphere with a light source chamber which is formed by a cone surface at 167 whose flanks are shaped to a convex lens cross-section, and matches the inside surface at 168 of tube 162; lead-in wire grooves are formed at 169 and 170. Elements 163 and 164, together with tube 162, are constructed around the equatorial axis.

Referring to Fig. 43 to Fig. 45 collectively which show the inner refracting elements for a floodlight full-beam electric lamp; having a tube 171 between two inner half full-beam refracting elements 172 and 173, all being made from heat resisting glass and fitting together on their junction surfaces at 174 and 175; each element 172 or 173 being an hemisphere with a light source chamber which is formed into a small convex lens surface at 176, with the other inner surfaces at 177 formed into a cone frustum whose flanks are shaped to a convex lens cross-section, and matches the inside surface at 178 of tube 171; lead-in wire grooves are formed at 179 and 180. Elements 172 and 173, together with tube 171, are constructed around the equatorial axis.

Referring to Fig. 46 to Fig. 48 collectively which show the inner refracting elements for a floodlight full-beam electric lamp; having a tube 181 between two inner half full-beam refracting elements 182 and 183, all being made from heat resisting glass and fitting together on their junction surfaces at 184 and 185; each element 182 or 183 being an hemisphere with a light source chamber which is formed into a small convex lens surface at 186, with the other inner surfaces at 187 formed into a cone frustum that matches the inside surface at 188 of tube 181; lead-in wire grooves are formed at 189 and 190. Elements 182 and 183, together with tube 181, are constructed around the equatorial axis.

Referring to Fig. 49 to Fig. 51 collectively which shows the inner refracting elements for a floodlight full-beam electric lamp; having a tube 191 between two inner half full-beam refracting elements 192 and 193, all being made from heat resisting glass and fitting together on their junction surfaces at 194 and 195; each element 192 or 193 having outer cone frustum surfaces at 196 and 197; each element 192 or 193 having a light source chamber which is formed into a small convex lens surface at 198, with the other inner surfaces at 199 formed into a cone frustum whose flanks are shaped to a convex lens cross-section, and matches the inside surface at 200 of tube 191; lead-in wire grooves are formed at 201 and 202. Elements 192 and 193, together with tube 191, are constructed around the equatorial axis.

The lamp in Fig. 1, is primarily designed for floodlight use, but can also be used for most any type of local lighting where it is desired to concentrate the light over a given area, by frosting the inside surface at the large end of the bulb at 15.

While I have not shown light propagation diagrams of the full-beam refracting elements shown and described herein, yet diagrams of them could be easily approximated after studying the diagrams in my co-pending applications, previously referred to, Serial Numbers 480,423, 480,424 and 480,425, with the full-beam refracting elements that they represent.

It would be a tremendous task to show by drawings, all of the possible combinations to make floodlight full-beam electric lamps which are basically illustrated in this invention; however those lamps could be ascertained by studying Fig. 1 and substituting therein any of the elements or features shown and described herein, or any element or feature shown or described in my co-pending applications referred to herein, which can be used with a floodlight lamp; therefore a further object of this invention, is that each part or each feature of that part which can be used with another part or feature shown or described in these applications, shall be improvements of this invention.

Whenever the words "refracting element" or "full-beam refracting element" or "outer full-beam refracting element" or "inner full-beam refracting element" or the plural "elements" in place of "element" with said words, are used herein, they are intended to mean the refracting elements shown and described herein, or in my copending applications Serial Numbers 480,421, 480,422, 480,423, 480,424 and 480,425, or any full-beam refracting element which is made with any improvement or feature described herein or therein.

Whenever the words "hollow metal wire" or "high pressure gas" or "hermetically sealed" or "final seal" or "pin-head electric lamp" are herein referred to, they are intended to have the same meaning as described in one or more of the previously mentioned patents (2,097,679, 2,137,732, 2,154,542, 2,222,093) from which this invention is a continuation.

Whenever the words "convex lens" or "convex lens shape" or "convex lens cross-section" are used herein to describe a curve or surface, they are intended to mean that such curve or surface has a form which resembles a convex lens or a convex lens curve; or any type of lens curve or surface which is corrected optically for spherical and chromatic aberration; or any type of curve or surface which will refract light-rays.

In view of the preceding description and the drawings, it is obvious that the improvements of this invention can be used to make many more floodlight full-beam electric lamps other than those shown and described herein; therefore in anticipation of the manufacture of such lamps, it is a further object of this invention to extend the claims to include any electric lamp which uses one or more of the improvements described or claimed herein.

I claim:

1. A floodlight electric lamp having a light source, leads to said light source, a receptacle closing the same, said receptacle composed of two transparent bodies hermetically sealed together, a light source chamber within said receptacle, said light source chamber surrounded by lens and prism sections arranged to form full-beam refracting elements, a lamp stem having a flared bottom with an exhaust tube and said receptacle mounted on top thereof, said stem flare hermetically sealed to the neck of a large lamp bulb with said receptacle positioned therein, said bulb having a mirrored curved surface for reflecting light from said receptacle in predetermined directions.

2. A floodlight electric lamp, comprising, a large lamp bulb having parabolic mirror flanks with a neck extending therefrom, said neck hermetically sealed to a stem flare being the lower end of a stem assembly within said bulb, said stem assembly consisting of, a light source, lead-in wires connected to said light source, a light source enclosure for the same being an inner full-beam refracting element composed of lens sections arranged to gather light in nearly all directions from said light source and project said light into an outer full-beam refracting element, said outer element enclosing said inner element, a stem tube having flared ends for mounting said outer element thereon and sealing to said bulb, said outer element composed of lens and prism sections arranged to project said light to said mirror of said bulb and thence in predetermined directions.

3. An outer full-beam refracting element for a floodlight electric lamp, consisting of, two elongated semi-circular bodies of light transmitting material hermetically sealed together on their junction surfaces, said bodies having lens and prism sections arranged around an elongated chamber to form full-beam refracting elements and give a maximum light value in predetermined directions.

4. An inner full-beam refracting element for a floodlight electric lamp, consisting of, two elongated semi-circular bodies of light transmitting material matching together on their junction surfaces, said bodies having lens surfaces formed into elongated light source chambers recessed from said junction surfaces, the outer surfaces of said bodies being complementary formed with the light source chamber lens surfaces to form lens sections of the full-beam refracting elements and give a maximum light value in predetermined directions.

HAROLD SWANSON.